Patented Aug. 19, 1924.

1,505,569

UNITED STATES PATENT OFFICE.

AUGUST LEOPOLD LASKA AND ARTHUR ZITSCHER, OF OFFENBACH-ON-THE-MAIN, GERMANY, ASSIGNORS TO THE CORPORATION CHEMISCHE FABRIK GRIESHEIM-ELEKTRON, OF FRANKFORT-ON-THE-MAIN, GERMANY.

AZO DYES DERIVED FROM ACYLACETYL COMPOUNDS OF DIAMINS AND PROCESS OF MAKING SAME.

No Drawing. Application filed November 23, 1922. Serial No. 602,896.

*To all whom it may concern:*

Be it known that we, AUGUST LEOPOLD LASKA and ARTHUR ZITSCHER, both citizens of the German Republic, and residents of Offenbach-on-the-Main, Germany, have invented certain new and useful Improvements in azo dyes derived from acylacetyl compounds of diamins and processes of making same; and we do hereby declare the following to be a full, clear, and exact description of the invention, such as will enable others skilled in the art to which it appertains to make and use the same.

Our invention relates to new azo dyestuffs, which can be used for the production of pigment colors and which can be also produced on the vegetable fibre.

We have found, that by combining a diazo compound not containing a sulfo or carboxylic group with a diacylacetyl compound of the general formula:

$$Y.CO.CH_2.CO.NH.R.—X—R'NH.CO.CH_2.CO.Y,$$

wherein R and R' represent the same or different aryl residues, Y any radical of the hydrocarbon series, X a connecting link, azodyestuffs, insoluble in water, are obtained, which are distinguished by valuable properties.

Under the term "any radical of the hydrocarbon series" for Y we include aliphatic as well as aromatic radicals, under the term "connecting link" atoms and atom complexes such as

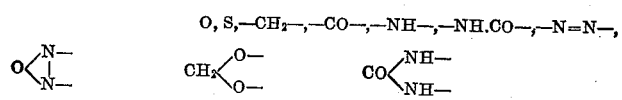

and the like.

The new dyestuffs are when dry yellow to brown and Bordeaux red powders, insoluble in water and soluble in sulfuric acid to a yellow to violet solution, they can be used for the production of valuable pigment colors and give, when produced on the fiber, shades of a complete fastness to washing and of an excellent fastness to chlorine.

As diazo compounds those of aniline and its homologues and substitution products, such as toluidine, anisidine, chloro- and nitroanilines, chloro- and nitrotoluidines, chloro- and nitroanisidines, also those of naphthylamines, aminoanthraquinones, aminoazo compounds, diamino bases and others are available for the process, as azocomponents we may use for example the diacylacetyl compounds from thioaniline, diaminodiphenylether, diaminodiphenylmethane, diamininobenzophenone, diaminoazobenzene, diaminoazoxybenzene, diaminodiphenylamine, diaminodiphenylurea, aminobenzoylphenylenediamine and so on, which can be obtained by condensing acylacetic acid esters with the corresponding bases.

The following examples illustrate the invention, the parts being by weight.

Example 1.

283 parts of 5-chloro-1.2-toluidine are diazotized in the usual manner and the diazo solution is added to a solution of 39 parts of di-acetoacetyl-4.4'-diaminobenzophenone in aqueous alkali, with the addition of a sufficient quantity of sodium acetate. When the combination is complete, the dyestuff is filtered, well washed and ground to a paste. Mixed with the usual substrata it forms a yellow lake of a very good fastness.

PRODUCTION OF THE DYESTUFFS ON THE FIBER

Example 2.

The yarn, having been well boiled and dried, is impregnated with a solution of 10 gr. of diacetoacetyl-4.4'-diaminoazoxybenzene 15 cc. of caustic soda lye of 34° Bé. and 20 cc. of Turkey red oil in the liter, well wrung out and without being dried, developed in a diazo solution, with an addition of sodium acetate and containing 2.6 gr. of ortho-chloroaniline in the liter.

In this manner clear, reddish yellow tints of a very good fastness are obtained.

*Example 3.*

The yarn, having been well boiled and dried, is impregnated with a solution of
10 gr. of di-acetoacetyl-4.4'-diaminoazobenzene
15 cc. of caustic soda lye of 34° Bé. and 20 cc. of Turkey red oil in the liter, well wrung out and without being dried, developed in a diazo solution with an addition of sodium acetate and containing 2.8 gr. of orthonitroaniline in the liter.

In this manner reddish yellow tints of a very good fastness are obtained.

The new dyestuffs can also be produced by printing a diazo solution upon a padded fabric according to the usual method, also according to the method of nitrosamine printing.

With other diazo compounds and other corresponding di-acetyl compounds of di-amino bases, the process may be conducted similarly.

The following table gives some of the shades of a number of the dyestuffs, prepared according to the present process and of the color lakes, respectively, obtained therefrom:

| Diazo compound from— | Combined with— | Shades |
|---|---|---|
| 5-Nitro-1.2-toluidine | Di-acetoacetyl-4.4'-diamino-benzophenone. | Yellow. |
| 5-Nitro-1.2-toluidine | Di-acetoacetyl-4.4'-diamino-3.3'-ditolylmethane. | Greenish yellow. |
| Ortho-aminoazotoluene | do | Brownish yellow |
| Aniline | Di-acetoacetyl-4.4'-diamino azobenzene. | Reddish yellow. |
| Ortho-chloroaniline | do | Do. |
| 2.5-Dichloroaniline | do | Do. |
| 5-Chloro-1.2-toluidine | do | Do. |
| 5-Nitro-1.2-toluidine | do | Yellow orange. |
| 4-Nitro-1-naphthylamine. | do | Yellow brown. |
| α-Aminoanthraquinone | do | Brownish orange. |
| Ortho-aminoazotoluene | do | Golden orange. |
| Ortho-anisol-azo-naphthylamine. | do | Cupreous brown. |
| 4.4'-Diaminodiphenylamine. | do | Reddish brown. |
| Dianisidine | do | Orange brown. |
| Ortho-aminophenylether | Di-acetoacetyl-4.4'-diamino-azoxybenzene. | Lemon yellow. |
| 2.5-Dichloroaniline | do | Do. |
| α-Aminoanthraquinone | do | Brownish orange. |
| Ortho-aminoazotoluene | do | Golden orange. |
| Ortho-chloroaniline | Di-acetoacetyl-4.4'-diamino-diphenyl-urea | Yellow. |
| 2.5-Dichloroaniline | do | Do. |
| 5-Nitro-1.2-toluidine | do | Yellow orange. |
| αAminoanthraquinone | do | Brown orange. |
| Ortho-amoniazotoluene | do | Yellow orange. |

Now what we claim and desire to secure by Letters Patent is the following:

1. As new products the azodyestuffs, insoluble in water, which can be obtained by combining a diazocompound not containing a sulfo or carboxylic group with a diacylacetyl compound of the general formula:

Y.CO.CH$_2$.CO.NH.R.X.
R'NH.CO.CH$_2$.CO.Y, wherein R and R' represent aryl residues, X a connecting link and Y any radical of the hydrocarbon series, which dyestuffs probably have the general formula:

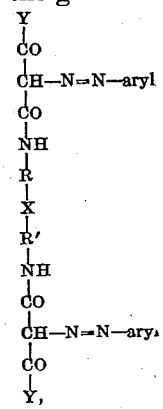

wherein R and R' represent aryl residues, X a connecting link and Y any radical of the hydrocarbon series, which are when dry yellow to brown and Bordeaux red powders, insoluble in water, and soluble in sulfuric acid to a yellow to violet solution, which dyestuffs yielding valuable lakes and, when produced on the fiber, fast yellow to brown and Bordeaux red shades.

2. A process of making azodyestuffs, insoluble in water consisting in combining a diazo compound not containing a sulfo or carboxylic group with a diacylacetyl compound of the general formula:

Y.CO.CH$_2$.CO.NH.R.X.
R'.NH.CO.CH$_2$.CO.Y, wherein R an R' represent aryl residues, X a connecting link and Y any radical of the hydrocarbon series.

3. A process of producing on the fiber of cotton goods azodyestuffs insoluble in water, which consists in treating the cotton goods after impregnation with a diacylacetyl compound of the general formula

Y.CO.CH$_2$.CO.NH.R.X.
R'.NH.CO.CH$_2$.CO.Y, wherein R and R' represent aryl residues, X a connecting link and Y any radical of the hydrocarbon series, with a diazo compound not containing a sulfo or carboxylic group.

4. As new products the azodyestuffs, insoluble in water, which can be obtained by combining a diazocompound not containing a sulfo or carboxylic group with a diacetoacetyl compound of the general formula:

CH₃.CO.CH₂.CO.NH.R.X.
R'.NH.CO.CH₂CO.CH₃, wherein R and R' represent aryl residues and X a connecting link, which dyestuffs probably have the general formula:

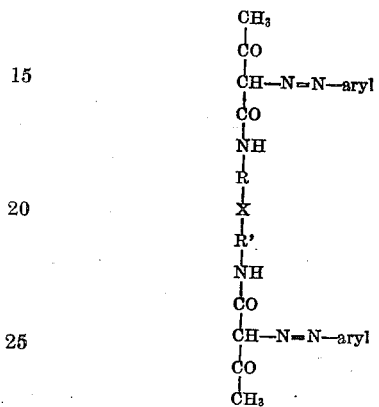

wherein R and R' represent aryl residues and X a connecting link, which are when dry yellow to brown and Bordeaux red powders, insoluble in water, and soluble in sulfuric acid to a yellow to violet solution, said dyestuffs yielding valuable lakes and, when produced on the fiber, fast yellow to brown and Bordeaux red shades.

5. A process of making azodyestuffs, insoluble in water consisting in combining a diazo compound not containing a sulfo or carboxylic group, with a diacetoacetyl compound of the general formula:

CH₃.CO.CH₂.CO.NH.R.X.
R'.NH.CO.CH₂.CO.CH₃, wherein R and R' represent aryl residues and X a connecting link.

6. A process of producing on the fiber of cotton goods, azodyestuffs insoluble in water, which consists in treating the cotton goods after impregnation with a diacetoacetyl compound of the general formula:

CH₃.CO.CH₂.CO.NH.R.X.
R'.NH.CO.CH₂.CO.CH₃, wherein R and R' represent aryl residues and X a connecting link, with a diazo compound not containing a sulfo or carboxylic group.

7. As new articles the azodyestuffs, insoluble in water, which can be obtained by combining a diazo compound negatively substituted and not containing a sulfo or carboxylic group, with a diacetoacetyl compound of the general formula:

CH₃.CO.CH₂.CO.NH.R.X.
R'.NH.CO.CH₂.CO.CH₃, wherein R and R' represent aryl residues and X a connecting link, which dyestuffs probably have the general formula:

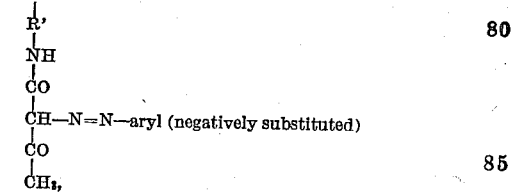

wherein R and R' represent aryl residues and X a connecting link, which are when dry yellow to brown and Bordeaux red powders, insoluble in water, and soluble in sulfuric acid to a yellow to violet solution, said dyestuffs yielding valuable lakes and, when produced on the fiber, fast yellow to brown and Bordeaux red shades.

8. A process of making azodyestuffs, insoluble in water consisting in combining a diazo compound negatively substituted and not containing a sulfo or carboxylic group, with a diacetoacetyl compound of the general formula:

CH₃.CO.CH₂.CO.NH.R.
X.R'.NH.CO.CH₂.CO.CH₃, wherein R and R' represent aryl residues and X a connecting link.

9. A process of producing on the fiber of cotton goods, azodyestuffs insoluble in water, which consists in treating the cotton goods after impregnation with a diacetoacetyl compound of the general formula:

CH₃.CO.CH₂.CO.NH.R.
X.R'.NH.CO.CH₂.CO.CH₃, wherein R and R' represent aryl residues and X a connecting link, with a diazo compound negatively substituted and not containing a sulfo or carboxylic group.

10. As new articles the azodyestuffs, insoluble in water, which can be obtained by combining a diazo compound not containing a sulfo or carboxylic group with diacetoacetyldiaminoazobenzene, which dyestuffs probably have the general formula:

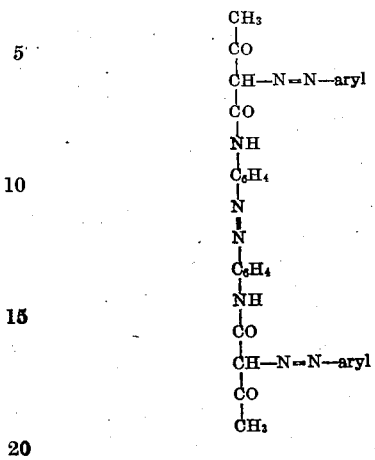

which are when dry yellow to brown and Bordeaux red powders, insoluble in water, and soluble in sulfuric acid to a yellow to violet solution, said dyestuffs yielding valuable lakes and, when produced on the fiber, fast yellow to brown and Bordeaux red shades.

11. A process of making azodyestuffs, insoluble in water consisting in combining a diazo compound not containing a sulfo or carboxylic group with diacetoacetyldiaminoazobenzene.

12. A process of producing on the fiber of cotton goods, azodyestuffs insoluble in water, which consists in treating the cotton goods, after impregnation with diacetoacetyldiaminoazobenzene, with a diazo compound not containing a sulfo or carboxylic group.

13. As new articles the azodyestuffs, insoluble in water, which can be obtained by combining a diazo compound negatively substituted and not containing a sulfo or carboxylic group, with diacetoacetyldiaminoazobenzene, which dyestuffs probably have the general formula:

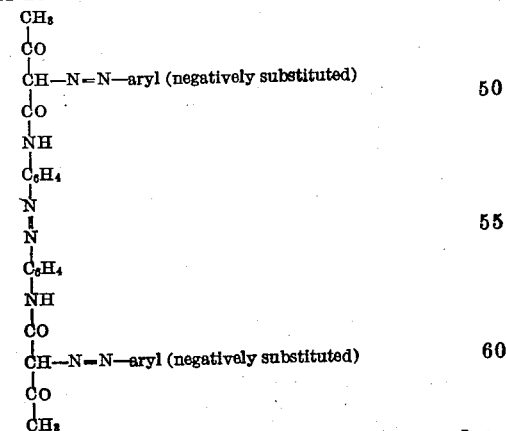

which are, when dry, yellow to brown and Bordeaux red powders, insoluble in water, and soluble in sulfuric acid to a yellow to violet solution, said dyestuffs yielding valuable lakes and when produced on the fiber, fast yellow to brown and Bordeaux red shades.

14. A process of making azodyestuffs, insoluble in water consisting in combining a diazocompound negatively substituted and not containing a sulfo or carboxylic group, with diacetoacetyldiaminoazobenzene.

15. A process of producing on the fiber of cotton goods, azodyestuffs insoluble in water, which consists in treating the cotton goods, after impregnation with diacetoacetyldiaminoazobenzene, with a diazocompound negatively substituted and not containing a sulfo or carboxylic group.

In testimony whereof we affix our signatures.

AUGUST LEOPOLD LASKA.
ARTHUR ZITSCHER.

Witnesses:
C. C. S. B. WYLES,
F. A. WILLIAMS.